(12) United States Patent
Datta

(10) Patent No.: US 7,373,380 B2
(45) Date of Patent: *May 13, 2008

(54) METHODS AND SYSTEMS FOR CONFIGURATION AND DYNAMICALLY SWITCHING BETWEEN NETWORK COMMUNICATION ARCHITECTURES

(75) Inventor: Glen Van Datta, San Diego, CA (US)

(73) Assignee: Sony Computer Entertainment America, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/481,439

(22) Filed: Jul. 5, 2006

(65) Prior Publication Data

US 2006/0253595 A1 Nov. 9, 2006

Related U.S. Application Data

(62) Division of application No. 10/211,075, filed on Jul. 31, 2002.

(60) Provisional application No. 60/381,715, filed on May 17, 2002.

(51) Int. Cl.
*G06F 15/16* (2006.01)

(52) U.S. Cl. ........................ 709/205; 709/228

(58) Field of Classification Search ................ 709/209, 709/204, 205, 225–226, 227–228
See application file for complete search history.

(56) References Cited

U.S. PATENT DOCUMENTS 5,630,757 A 5/1997 Gagin et al.
5,682,139 A 10/1997 Pradeep et al.
5,704,032 A * 12/1997 Badovinatz et al. ........... 714/4

(Continued)

FOREIGN PATENT DOCUMENTS

EP 1 125 617 A2 8/2001

(Continued)

OTHER PUBLICATIONS

Festa et al., "Netscape Alumni to Launch P2P Company," Aug. 2, 2001, (7 pages).

(Continued)

*Primary Examiner*—Bunjob Jaroenchonwanit
*Assistant Examiner*—Van Kim T Nguyen
(74) *Attorney, Agent, or Firm*—Martine Penilla & Gencarella, LLP

(57) ABSTRACT

The disclosure relates to a multi-user application that is configured to operate in various network communication configurations and that can dynamically change communication configurations during an online session of the application. One of the network communication configurations is a client-server configuration, wherein network computers, including at least one server computer and at least one client computer, participate in an online session of the application. The server computer serves application-related data to the client computer during the online session. In another communication configuration of the application, the network computers operate in a peer-to-peer configuration wherein the network computers have the ability to both serve data to and receive data from any of the other network computers that are participating in the online session. The application can switch between the communication configurations during an online session, and is not limited to one or the other for all the computers.

5 Claims, 12 Drawing Sheets

U.S. PATENT DOCUMENTS

| | | | |
|---|---|---|---|
| 5,838,909 | A | 11/1998 | Roy et al. |
| 5,841,980 | A | 11/1998 | Waters et al. |
| 5,893,106 | A | 4/1999 | Brobst et al. |
| 5,956,485 | A | 9/1999 | Perlman |
| 5,984,787 | A | 11/1999 | Redpath |
| 5,987,376 | A | 11/1999 | Olson et al. |
| 6,041,312 | A | 3/2000 | Bickerton et al. |
| 6,125,122 | A * | 9/2000 | Favichia et al. ............ 370/466 |
| 6,152,824 | A * | 11/2000 | Rothschild et al. .......... 463/42 |
| 6,219,045 | B1 | 4/2001 | Leahy et al. |
| 6,311,209 | B1 | 10/2001 | Olson et al. |
| 6,463,078 | B1 * | 10/2002 | Engstrom et al. ........... 370/466 |
| 6,487,678 | B1 * | 11/2002 | Briskey et al. ................ 714/4 |
| 6,560,636 | B2 * | 5/2003 | Cohen et al. ............... 709/203 |
| 6,561,811 | B2 | 5/2003 | Rapoza et al. |
| 6,607,444 | B2 | 8/2003 | Takahashi et al. |
| 6,631,412 | B1 | 10/2003 | Glasser et al. |
| 6,676,521 | B1 | 1/2004 | La Mura et al. |
| 6,748,420 | B1 * | 6/2004 | Quatrano et al. .......... 709/205 |
| 6,761,636 | B2 | 7/2004 | Chung et al. |
| 6,931,446 | B1 * | 8/2005 | Cox et al. ................... 709/227 |
| 7,003,550 | B1 | 2/2006 | Cleasby et al. |
| 7,018,295 | B2 | 3/2006 | Sakaguchi et al. |
| 7,056,217 | B1 * | 6/2006 | Pelkey et al. ................ 463/43 |
| 7,107,312 | B2 | 9/2006 | Hackbarth et al. |
| 7,240,093 | B1 * | 7/2007 | Danieli et al. ............. 709/205 |
| 2001/0009868 | A1 | 7/2001 | Sakaguchi et al. |
| 2001/0044339 | A1 | 11/2001 | Cordero et al. |
| 2002/0035604 | A1 | 3/2002 | Cohen et al. |
| 2002/0049086 | A1 | 4/2002 | Otsu |
| 2002/0062348 | A1 | 5/2002 | Maehiro |
| 2002/0133707 | A1 | 9/2002 | Newcombe |
| 2003/0073494 | A1 | 4/2003 | Kalpakian et al. |
| 2003/0217135 | A1 | 11/2003 | Chatani |
| 2004/0117443 | A1 | 6/2004 | Barsness |
| 2006/0100020 | A1 | 5/2006 | Kasai |

FOREIGN PATENT DOCUMENTS

| | | |
|---|---|---|
| WO | WO 00/05854 | 2/2000 |
| WO | WO 01/82678 | 11/2001 |
| WO | WO 02/35769 | 5/2002 |

OTHER PUBLICATIONS

Diot et al. "A Distributed Architecture for Multiplayer Interactive Applications on the Internet," IEEE vol. 13. Issue 4, Aug. 1999, (10 pages).

European Search Report for EP 03 72 1413m Jun. 30, 2005, (4 pages).

Cisco Systems, Inc., "Network Flow Management: Resource Reservation for Multimedia Flows," Mar. 19, 1999, (12 pages).

* cited by examiner

| Index | Session Master | Active Port/Protocol Type |
|---|---|---|
| 1 | Owns C1 | 80/TCP, 90/UDP |
| 2 | Owns C2, C3 | 85/TCP, 95/UDP |
| 3 | - | - |
| - | - | - |
| - | - | - |
| - | - | - |

METHODS AND SYSTEMS FOR CONFIGURATION AND DYNAMICALLY SWITCHING BETWEEN NETWORK COMMUNICATION ARCHITECTURES

CLAIM OF PRIORITY

This application is a Divisional Application of U.S. application Ser. No. 10/211,075, filed on Jul. 31, 2002, which claims priority of U.S. Provisional Patent Application No. 60/381,715, filed on May 17, 2002, entitled "Configuration Switching: Dynamically Changing Between Network Communication Architectures", by Glen Van Datta, each of which is hereby incorporated by reference.

RELATED APPLICATIONS

This application is related to U.S. patent application Ser. No. 10/211,128, entitled "DYNAMIC PLAYER MANAGEMENT", filed on Jul. 31, 2002, U.S. patent application Ser. No. 11/375,526, entitled "DYNAMIC PLAYER MANAGEMENT", filed on Mar. 13, 2006, and U.S. patent application Ser. No. 11/403,623, entitled "MANAGING PARTICIPANTS IN AN ONLINE SESSION", filed on Apr. 13, 2006, all of which are incorporated herein by reference.

BACKGROUND

1. Field of the Invention

The present invention relates generally to computer networks and, more particularly, to computer configurations for network communications.

2. Description of the Related Art

Computer networks, such as local area networks and the Internet, are increasingly being used as the backbone for various transactions and interactions between parties. From online banking, where bank customers can initiate financial transactions on a computer network, to online gaming, where gamers can participate in various games over the Internet, service providers are increasingly providing a variety of services over computer networks. There are currently a variety of different computer network configurations that facilitate the transactions and interactions that take place.

One type of configuration is a classic client-server configuration, such as is illustrated in FIG. 1. In this configuration, a dedicated server computer 110 is communicatively linked to one or more client computers 120 over a network, such as through the Internet. The client computer 120 makes service requests to the server computer 110 and the server computer 110 fulfills the request by transmitting data to the requesting client computer 120 over the network. The server computer 110 can be connected to a data storage device or to other computer devices that facilitate transactions between the client and server computers. One characteristic of the client-server configuration is that the client computers cannot communicate directly with one another, as the client computers are limited to communicating with the server computer.

For example, where the client-server configuration is operated in an online gaming environment, the server computer 110 can be responsible for maintaining the various states that are associated with the online game. The server computer can be connected to other computers, such as a memory engine 140 that maintains one or more instances of a game, while the server computer 110 manages administrative matters such as player matching and account management. A game player on the client computer 120 can log onto the server computer 110 and receive a list of available games and participating players. The player chooses a game to start or join, thereby identifying a memory engine with which the player's computer establishes a client-server connection. In this manner, the server computer 110 and the memory engine 140 collectively administer the gaming environment for one or more client computers 120.

Another type of configuration is referred to as an integrated server configuration, such as is shown in FIG. 2. This configuration includes a dedicated server computer 110 and one or more client computers 120 that are each connected to the server computer 110 over a computer network. As in the previously-described configuration, the server computer 110 serves data to the client computers 120. However, one of the client computers 120, such as the client computer 120a, functions as an integrated server in that the client computer 120a can serve data to the other client computers 120. The client computer 120a can thereby share some of the processing load associated with maintaining the online environment. For example, in an online gaming environment, the server computer 110 can perform administrative functions, such as player matching, account management, and chat room management, while the client computer/integrated server 120a can perform the function of the previously-described memory engine.

In yet another type of communication configuration, the various computers are arranged in a peer-to-peer configuration, such as is shown in FIG. 3. In a peer-to-peer configuration, each of the computers can communicate with the others, so that all of the computers function as "peers". In one form of the peer-to-peer configuration, a dedicated server 110 is communicatively connected to a plurality of client computers 120 over a network. An online session is initially established by each of the client computers 120 connecting to an administrative computer, such as the server computer 110. The client computers 120 are then communicatively connected to one another so that each of the client computers 120 has the ability to both serve and receive data to and from any of the other client computers 120. In addition, each client computer 120 can operate in a client-server relationship with the dedicated server 110. Those skilled in the art will appreciated that there are other communication configurations in addition to the configurations described above.

There are advantages and disadvantages that are associated with each of the different communication configurations. For example, the client-server configuration allows the use of a powerful computer as the dedicated server, which can be advantageous where a large amount of data processing by the server computer is required. On the other hand, the use of a powerful dedicated server computer can be expensive for the operator of the server and can also be overkill where the server is also used in situations that do no require such processing power. An advantage of the peer-to-peer configuration is faster communication speeds, because the client computers share data directly amongst each other, rather than sharing their data through the server. This reduces the quantity of data transfers that occur over the connected network. Unfortunately, the communication in peer-to-peer communication can be slowed where one of the client computers does not have a large communication bandwidth.

Some specific examples of the various advantages and disadvantages of the different communication configurations can be seen in an online gaming environment. Certain types of games involve many simultaneous players and require large amounts of centralizes data processing to maintain the game environment, such as action games and role playing games that often involve hundreds of players participating in a single game instance. Such games might be more suitable for the client-server configuration, where a powerful dedicated server can be employed for the data processing. On the other hand, a client-server configuration would not be ideal for other types of games that do not require such powerful data processing because the server resources would be under-utilized. This is often the case for games such as sports games that often include only a few players per instance of a game. A peer-to-peer configuration could be more suited to such a game environment, where the data processing can be more easily allocated among the multiple computers participating in the game and a centralized server would not be needed to maintain the game environment.

Unfortunately, current network systems that provide online, multi-user applications are set up to operate exclusively in one of the aforementioned configurations. For example, a multi-user application such as an action game or a role playing game (RPG) might operate in the classic client-server configuration and will be limited to operating in that configuration during the pendency of the session. The application cannot switch to another configuration if circumstances warrant, such as if the number of players is reduced to a number more like a sports game.

Additionally, some networking components will only work in a specific configuration because of network restrictions. These restrictions can require certain clients to be connected in a client-server circumstance, while others will be connected in a peer-to-peer configuration.

SUMMARY

A multi-user application that operates in accordance with the present invention can operate in various network communication configurations and can dynamically change communication configurations during an online session of the application. One of the network communication configurations is a client-server configuration, wherein network computers, including at least one server computer and at least one computer operating as a client computer, participate in an online session of the application. In the client-server configuration, the server computer serves application-related data to the each of the client computers during the online session. In another communication configuration of the multi-user application, the network computers operate in a peer-to-peer configuration wherein the network computers have the ability to both serve data to and receive data from any of the application. Thus, the application can switch between the communication configurations during an online session.

The multi-user application can operate such that some of the computers executing the application are communicating in a client-server configuration while others are communicating in a peer-to-peer configuration. The application can determine when to change from one configuration to another. For example, the multi-user application can comprise a network communications manager through which a user registers to gain access to other end user applications, such that the communications manager can determine the appropriate communications configuration (client-server or peer-to-peer) that is best suited for the end user application. The application can alternatively determine the appropriate communications configuration in accordance with available bandwidth. In this way, the application can select a peer-to-peer communications configuration if a relatively small number of users are engaged in an online session, and can select a client-server communications configuration when a larger number of users are involved.

In one aspect of the invention, the multi-user application designates one of the network computers as a session master that is responsible for performing certain functionality related to maintaining the online session of the application. The application can operate in a dedicated mode wherein the session master function is fixedly assigned to a particular computer participating in the online session. The application can also operate in a migratory mode wherein the session master function can migrate from one network computer to another network computer that is participating in the online session. Accordingly, the session master function can migrate from one network computer to another when the network computer that is initially assigned as the session master exits the online session. In addition, the session master functionality can be distributed among more than one of the network computers in the online session.

Other features and advantages of the present invention should be apparent from the following description of the preferred embodiment, which illustrates, by way of example, the principles of the invention.

BRIEF DESCRIPTION OF THE DRAWINGS

FIG. 5 is an illustration of a data structure that includes computer index and session master information for the multi-user application configured as shown in FIG. 4.

DETAILED DESCRIPTION

Figure 4:
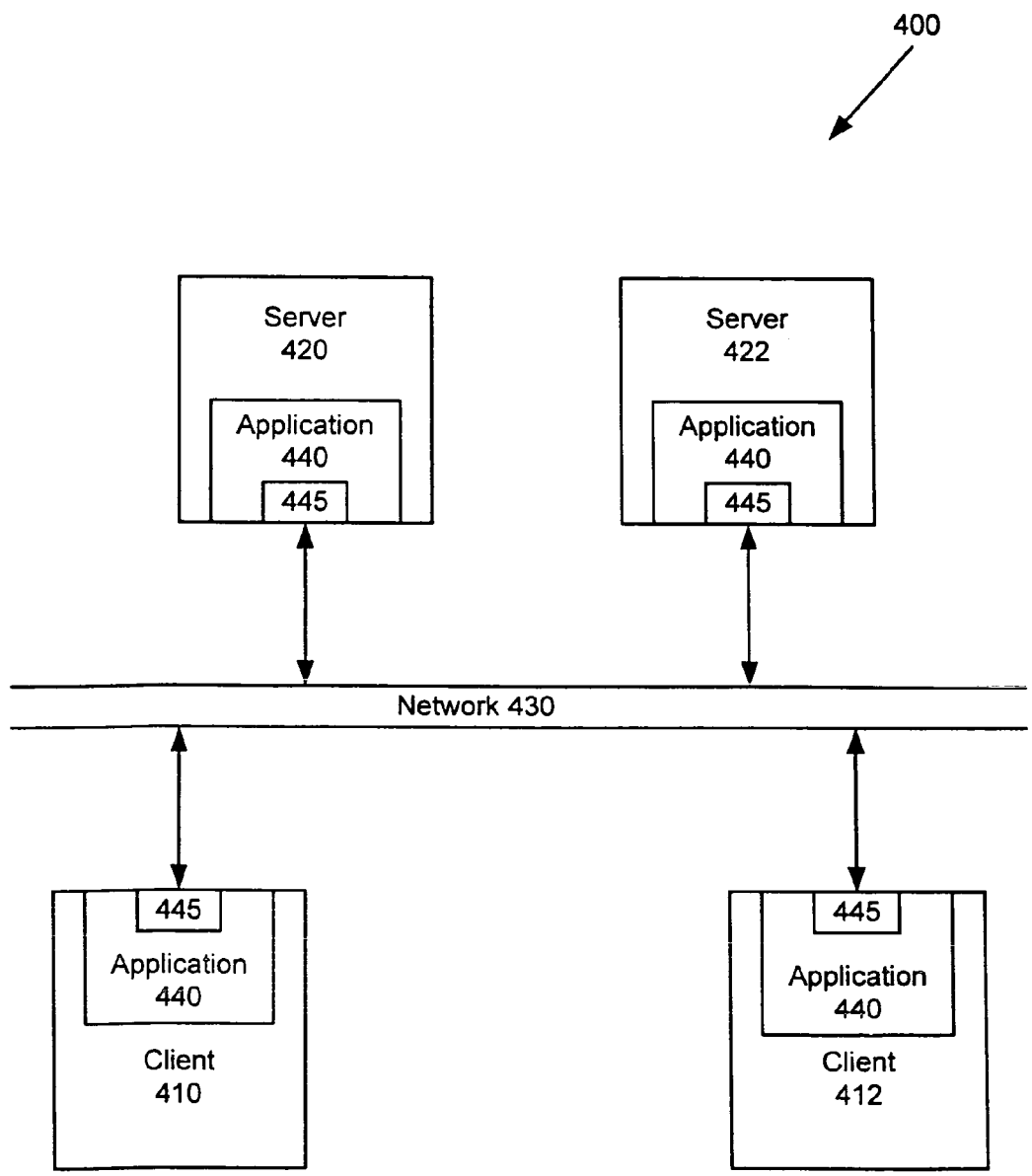
FIG. 4 is an illustration of a computer network system on which is run a multi-user application configured in accordance with the present invention.

FIG. 4 is a block diagram of a computer network system 400 comprised of one or more network devices including one or more client computers 410, 412 and one or more dedicated server computers 420, 422, which are nodes of a computer network 430. Thus, some of the network computers are configured as servers and some are configured as clients. The computer network 430 can comprise a collection of interconnected networks, such as the Internet, and can include one or more local area networks at each of the nodes 410, 412, 420, 422. As used herein, the term "Internet" refers to a collection of interconnected (public and/or private) networks that are linked together by a set of standard communication protocols to form a global, distributed network.

The client computers 410, 412 can transmit requests for data over the network 430 to one of the server computers 420, 422, which are configured to serve data over the network 430 to the client computers in a well-known manner. The server computers 420, 422 can include or can be communicatively linked to each other and to other servers, such as a data base server and/or an application server, as will be known to those skilled in the art. Although FIG. 4 shows only two client computers 410, 412 and two server computers 420, 422, it should be appreciated that the network system 400 could include any number of client computers 410, 412 and server computers 420, 422. The server computers 420, 422 and client computers 410, 412 are sometimes referred to collectively herein as network computers.

The network system 400 supports a multi-user application 440 comprised of a computer program with which multiple users can interact in online sessions using network devices (such as the client computers 410, 412) that are linked to the computer network 430. The application 440 is installed at each of the client computers, meaning that an operational instance of the application is stored in memory of each of the client computers 410, 412 that run (execute) the application 440. Each server computer that will be participating in an online session of the multi-user application also stores an instance of the application 440. For purposes of this description, the first server computer 420 will be assumed to be a server for the multi-user application being executed by the client machines 410, 412, although both servers 420, 422 are shown with installed applications 440. An exchange of data occurs between instances of the application 440 during execution and is enabled through the establishment of network sockets 445 at each of the network computers. The sockets are represented in FIG. 4 as boxes at each respective network computer. Those skilled in the art will understand that a network socket is one end of a multi-way communication link between two or more programs that run on the network system 400.

Figure 1:
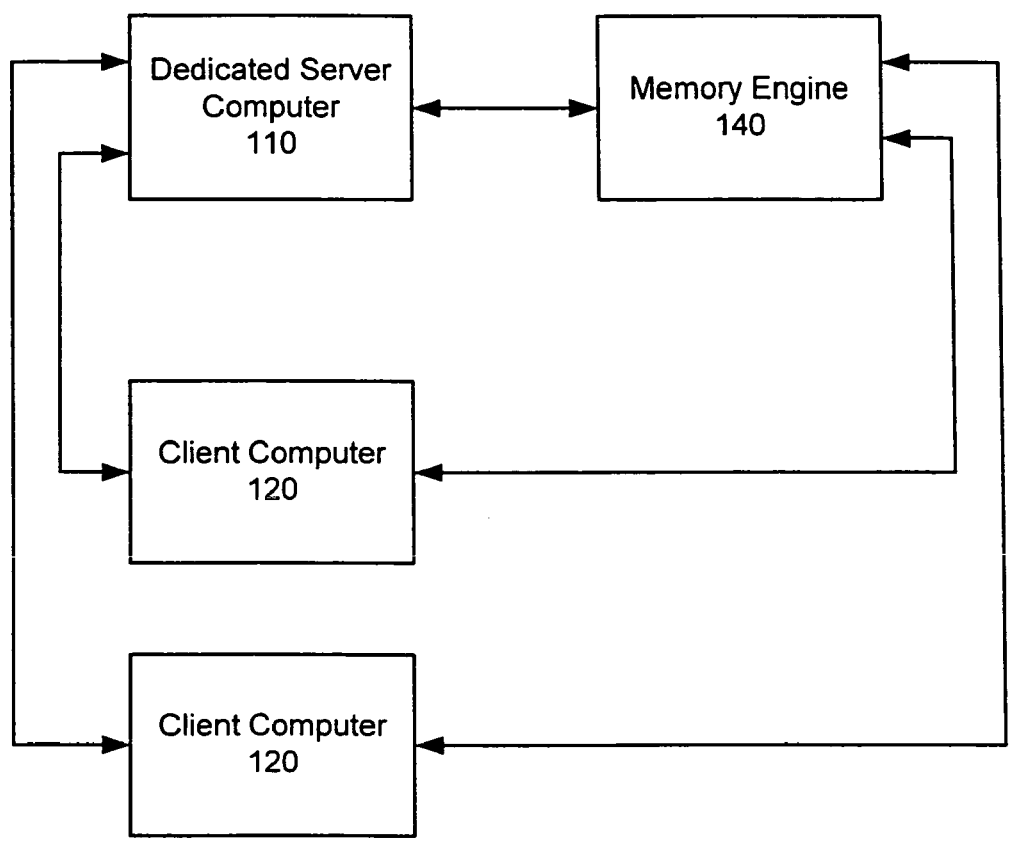
FIG. 1 is an illustration of a computer network arranged in a client-server network communication configuration.
Figure 2:
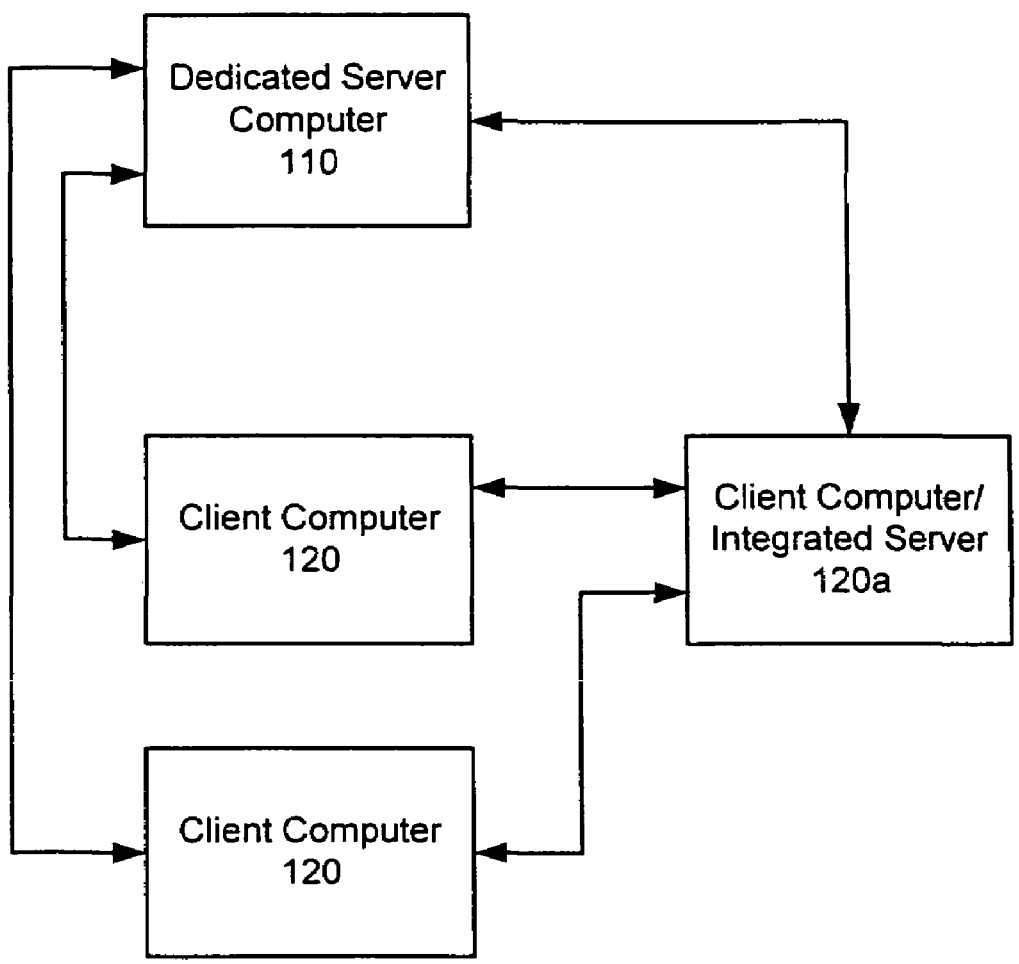
FIG. 2 is an illustration of a computer network arranged in an integrated network communication server configuration.
Figure 3:
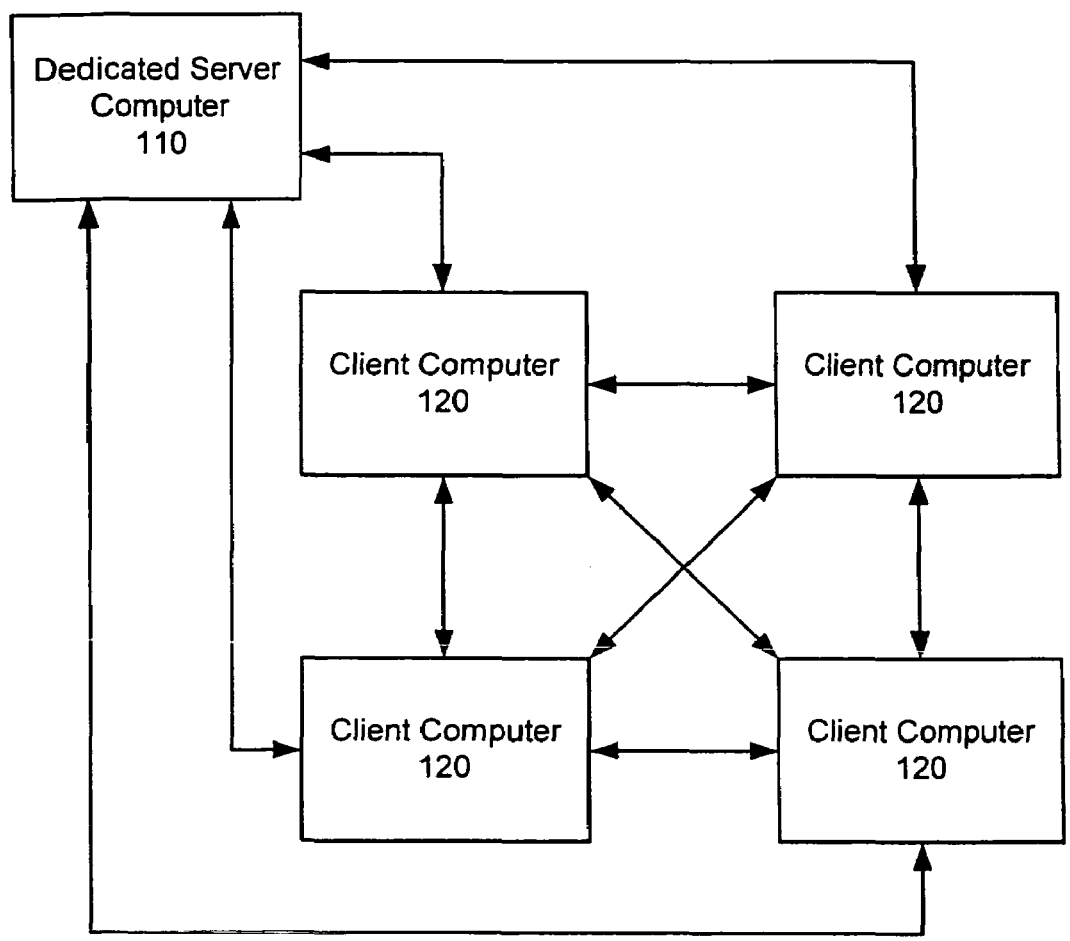
FIG. 3 is an illustration of a computer network arranged in a peer-to-peer network communication configuration.

The application 440 can be run on the network devices of the network system 400 according to a variety of communication configurations and the responsibilities for various application-related processes can be assigned to different computing devices of the network 430, as described in more detail below. An application development interface is preferably used to develop the application 440, as is also described in more detail below. The application can be operated such that the associated network computer can use a communications configuration to implement any of the communication modes illustrated in FIG. 1, FIG. 2, and FIG. 3.

The multi-user application 440 can be any type of application that a user can run on a network computer that is linked to the computer network 430. When the application 440 is run on a client computer 410, 412, the user can interact with other users through other network computers that are also running the application 440. The server computer 420 can function as a central network "meeting point" through which the users can establish contact, maintain data, and initiate an online session of the application 440. Typically, the application 440 causes the network device in which it is operating to establish communications with another network device, such as the devices 410, 412, 420, thereby initiating an online session. During the online session, the network computers will interact and exchange data pursuant to the programmed features of the application 440.

When the application 440 is launched and an online session is established among suitably configured computers, the application enables the computers to interact in a variety of communication configurations. Throughout this description, the application 440 is sometimes described in an online-gaming scenario, wherein the application 440 comprises a computer game that multiple users can access and run using the client computers 410, 412. In such a case, the application 440 establishes an online session comprised of a game in which the network computers participate. However, it should be appreciated that the application 440 can also relate to other scenarios besides gaming, such as, for example, online banking or online travel planning, that involve interactions between multiple computers on a computer network.

The multi-user application 440 can operate such that some of the client computers executing the application 410, 412 are communicating in a client-server configuration while others are communicating in a peer-to-peer configuration. The application can determine when to change from one configuration to another. Moreover, the multi-user application 440 can be configured as a network communications manager, such as a game portal or program portal, that grants access to end user applications such as games or end user programs. Alternatively, the communications management function and end user program can be integrated into the multi-user application 440. In either situation, the multi-user application 440 can determine the appropriate communications configuration (such as client-server or peer-to-peer) that is best suited for the end user application. For example, the application can select a peer-to-peer communications configuration if a relatively small number of users are engaged in an online session, such as a group of five or six users engaged in a game, and can select a client-server communications configuration when a larger number of users are involved, such as for large online sessions or role-playing games involving hundreds of players. Alternatively, the application can determine the appropriate communications configuration in accordance with available bandwidth, so that even a small group of users might be best suited for the client-server configuration. The available bandwidth selection criterion can be applied at the individual level, if desired, such that one user with limited bandwidth might be constrained to a client role in a client-server configuration while other users operate in a peer-to-peer fashion.

When an application 440 executes, it identifies a session master, which is a network computer that performs a variety of managerial and administrative functions for the application with respect to interactions between computers that occur during an online session. An online session of the application uses a registration or logon process with a data store containing information such as user identification. The logon process authorizes further participation in the network environment of the application. Preferably, the session master function is assigned when a client computer running the application 440, such as the client computer 410, logs onto the server computer 420 to initiate an online session. The application itself, however, determines the details of when and how such assignments are made, so that a variety of session master assignment schemes can be implemented without departing from the teachings of the present invention.

The operating instance of the application on the client computer 410 that initiates an online session of the application is referred to as the host computer. The application at the host computer assigns the session master function to either the server computer 420 or to the host computer 410. As new client computers log-on (register) with the server computer 420 to join the online session, the server computer 420 notifies the new clients of the already-assigned identity of the session master computer.

As described more fully below, the session master functionality enables a smooth transition between the various network communication configurations in which the application 440 can operate. The session master function also enables the application 440 to concentrate responsibility for application-related tasks in a specific network computer, or to distribute such responsibility among two or more network computers. The assignment of tasks can be performed by an instance of the application 440 on one of the network computers, at the same time when the session master function is assigned, and the session master tasks can be assigned to one or more of the computers on the network 430 for providing the requisite functionality. The computer or computers that are assigned responsibility of the session master are referred to herein as the "owners" of the respective session master functions. References to a solitary session master will be understood to apply to a group of computers, if those computers are collectively performing the session master functions. Thus, the assignment of session master tasks is performed in the manner specified by the application, in accordance with the dictates of the application developer.

As mentioned above, the session master provides operational advantages, one of which is the distribution of certain responsibilities among the computers that are participating in the online session. For example, certain tasks associated with the application 440 can have large data processing requirements that could consume a large amount of the processing power of one network computer. An instance of the application 440 on one of the network computers can assign certain of these tasks to the session master and assign ownership of the session master to a particular computer that might be better suited for the tasks. The application 440 could also maintain plural session masters among several computers, each of which is assigned certain tasks relating to the online session. In this manner, the tasks can be distributed among plural computers so that a single computer is not overburdened for responsibility of all tasks.

The session master function also provides efficient network bandwidth utilization through the use of message filtering responsibilities, as described in more detail below. Furthermore, when a network computer that owns the session master function leaves the online session, an instance of the application 440 on one of the remaining network computers might re-assign the session master responsibilities of the previous session master computer to another network computer, thereby enabling a smooth transition in the online session without disruption to the operations performed by the session master. This also enables the application 440 to switch communication configurations on-the-fly by re-assigning the responsibilities of the session master from one computer to another, such as from the server 420 to a client computer 410 during an online session. In such a manner, the application 440 dynamically switches between communication configurations during an online session, such as from a client-server configuration to a peer-to-peer configuration and vice-versa.

One category of session master responsibilities relates to application-specific functions, which are functions that are peculiar to the particular type of application 440. For example, if the application 440 is a game-type application, then the session master or a group of session masters can keep track of game-type data, such as the game score, the time remaining in the game, and can perform game functions, such as terminating the session when a game ends. A session master can also be assigned to keep track of specific game data, such as the state of an object in the game environment, such as a football, ocean, tree, etc. These responsibilities can be concentrated in a single session master or divided up among several session masters. In a classic client-server configuration, a dedicated server can be assigned ownership of the session master or session masters during an online session. An instance of the application 440 on one of the network computers can then re-assign ownership of the session masters from the dedicated server to one of client computers so that the configuration switches to peer-to-peer, as described more fully below.

Another category of responsibilities for the session master is message filtering. During the course of an online session, the application 440 can cause the network computers to send out communication messages regarding various aspects of the online session. The messages can vary and can relate to, for example, messages describing the state of an online session, chat messages between users, and timing messages that update game time. The messages can also include update messages that a network computer sends to alert other network computers that the sending computer is still participating in the online session.

In certain instances, the session master maintains filters that determine whether communications should be sent to certain of the network computers. The application 440 is configured so that some or all of the messages are first sent to the session master computer for filter analysis. The session master preferably maintains the filters and prevents communications from being transmitted where inappropriate. The session master preferably maintains a filter list that the session master consults for filtering the sending of messages. The filter list specifies, for certain message types, which computers should not receive the message.

For example, in an online gaming environment, each client computer could be responsible for a character that moves about in a virtual world, with messages being sent that contain data regarding the state of items in the virtual world. If the messages pertain to items that are outside of the scope of awareness of a certain character, then it would not be necessary to update the network computer associated with that character. In such a case, it would be desirable for the session master to filter the message to prevent it from being sent to the computer. This provides for efficient bandwidth utilization so that only messages that need to be sent are sent.

The host computer performs managerial functions related to the computers that are participating in the online session. For example, whenever a network computer joins an online session of the application 440, the host computer assigns an identification index number to the computer joining the session. The host computer maintains a list of the identification index numbers and their associated network computers. The index number is used when sending messages and is also used to maintain ownership records regarding the session master functionality.

As noted above, there can be more than one session master in an online session. The way in which a session master is assigned can be determined by the application in accordance with the operation of the application. The application 440 can also assign the session master with responsibility for sending out update messages to update the network computers regarding the status of all network computers that are participating in the online session. This responsibility entails the session master notifying the participating network computers when a new network computer joins the online session, or when a current participant exits the online session of the application 440, as described more fully below.

The host computer that assigns the aforementioned index number to each of the computers also maintains a list of all network computers that are participating in the online session. The application 440 then keeps track of session master ownership according to the index number assigned to the computer. To keep track of the index number and responsibility assignments, the application 440 can maintain a data structure such as in the form of a table comprised of a network computer index list, such as the table 500 shown in FIG. 5. The table 500 contains an index number associated with each network computer that is participating in the online session, and also contains an indication of whether the network computer owns the session master function. The index list data structure comprising the table 500 preferably also specifies the communication protocol that is being used for each network computer. FIG. 5 shows that different session master tasks (C1, C2, C3) can be owned by different network computers.

In addition to specifying the communication protocol, the data structure also specifies, for each network computer, the port for which the communication protocol is associated. Each instance of the application 440 enables the associated network computer that is participating in the online session to open multiple communication ports, with each port being associated with a particular communication protocol. The network computers communicate with other network computers using a particular port and a particular protocol, which is specified in the data structure comprised of the table 500 shown in FIG. 5. The ports can comprise network sockets through which the instances of the application 440 communicate over the network. The network computers preferably communicate the port/protocol information, as well as the other information contained in the index list, by periodically sending communication messages to one another over the network.

When a network computer connects to the server computer 420 to establish an online session, the instance of the application 440 on the network computer can assign ownership of the session master to one of the network computers, as described in detail below with reference to FIG. 5. In this regard, the instance of the application 440 on each network computer preferably maintains a list of all network computers that are participating in the online session and associates the aforementioned index number to each of the computers. The application 440 then keeps track of session master ownership according to the index number assigned to the computer.

The network computers can maintain a data structure in the form of a table comprised of a network computer index list, such as the table 500 shown in FIG. 5, wherein the table contains an index number associated with each network computer that is participating in the online session, as well as containing an indication of whether the computer owns one or more session master functions. The index list data structure preferably also specifies the communication protocol that is used for each network computer. Preferably, all of the computers that are participating in the online session keep a copy of the table 500 index list. It should be appreciated that the table 500 is merely exemplary and that the application 440 could keep track of network computer index numbers, communication configuration, and session master ownership in other manners using a wide variety of data structure formats.

The application can change the communication configuration and protocol during the online session. As noted above, the determination of which communication configuration to use can be dependent on the nature of the application (such as a one-on-one game versus a large-scale role playing game) or on the number of online session participants, or on the available bandwidth. For example, a peer-to-peer configuration might be best suited for a relatively small number of online session participants, while a client-server communications configuration might be the only practical situation for an application environment involving hundreds of users in an online session. The actual decision parameters for selecting one communications configuration over another will vary depending on the resource requirements of the application, and will be known to the application developer.

The application 440 can assign ownership of the session master according to different schemes, or combinations of schemes. In a first scheme, shown in FIG. 6, the application 440 has assigned ownership of a session master 600 to a single computer, such as the dedicated server computer 420. The computer that is assigned ownership of the session master 600 has responsibility for all of the functionality associated with the session master 600 as dictated by the application 440. In the instant example, the dedicated server computer 420 owns the session master. Thus, the application 440 at each network computer will operate in a client-server communication configuration with respect to the functions of the session master, with the server computer 420 serving data to the client computers 410 relating to the session master responsibilities.

Figure 6:
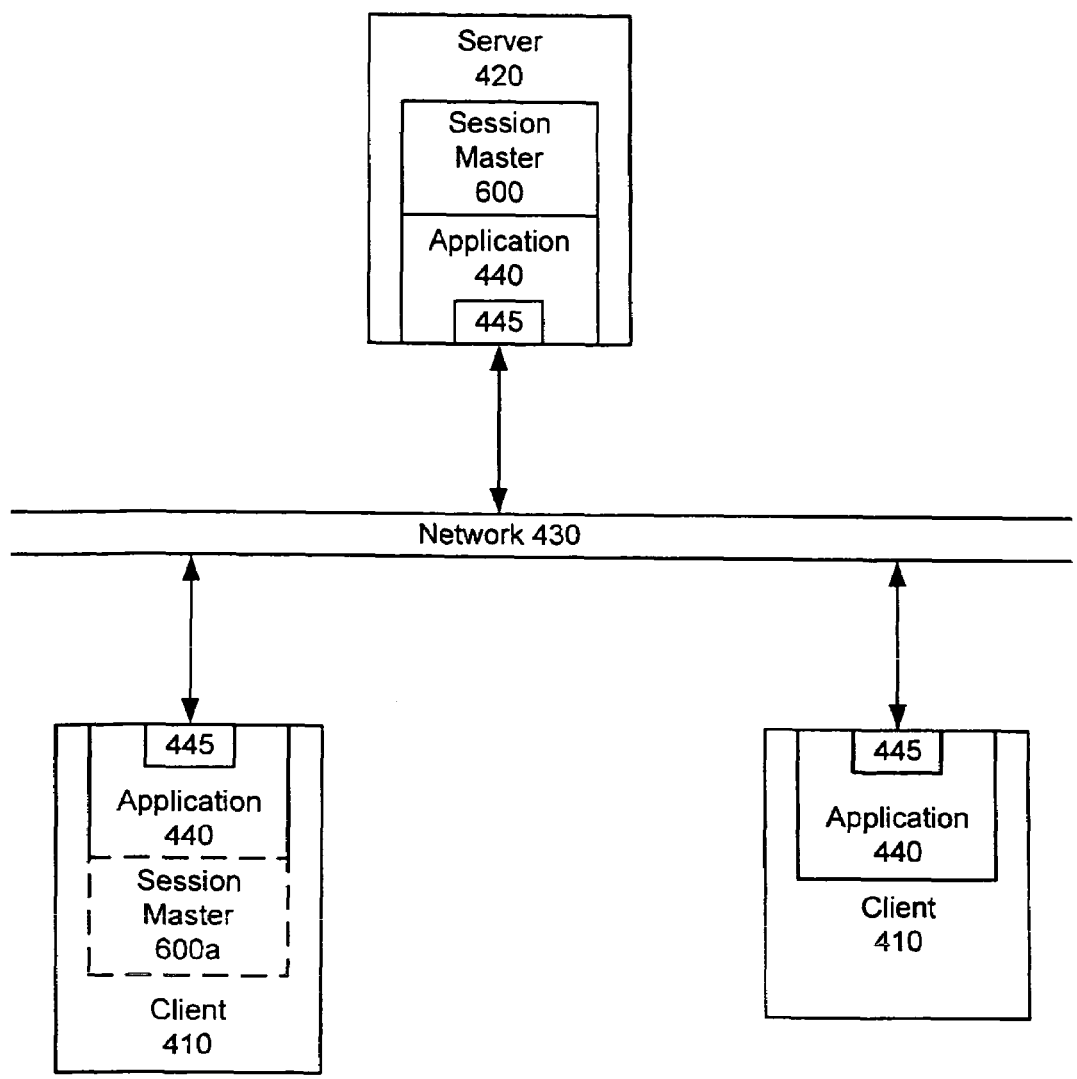
FIG. 6 is an illustration of a computer network system wherein the multi-user application is arranged in a first type of communication configuration where a server computer or a client computer is designated as a session master.

It should be appreciated that any of the computers that are participating in the online session of the application 440 could have ownership of the session, such as where the client computer 410 is shown owning a session master 600a, which is shown in FIG. 6 using phantom lines. Moreover, the application 440 can maintain several instances of a session master, with each session master being assigned specific responsibilities and each session master being assigned to different network computers or the same computer. For example, FIG. 6 shows a situation where there are two session masters 600 and 600a, each being assigned responsibility for certain functionality relating to the online session of the application 440. The client 410 with the session master 600a is operating as an integrated server.

Figure 7:
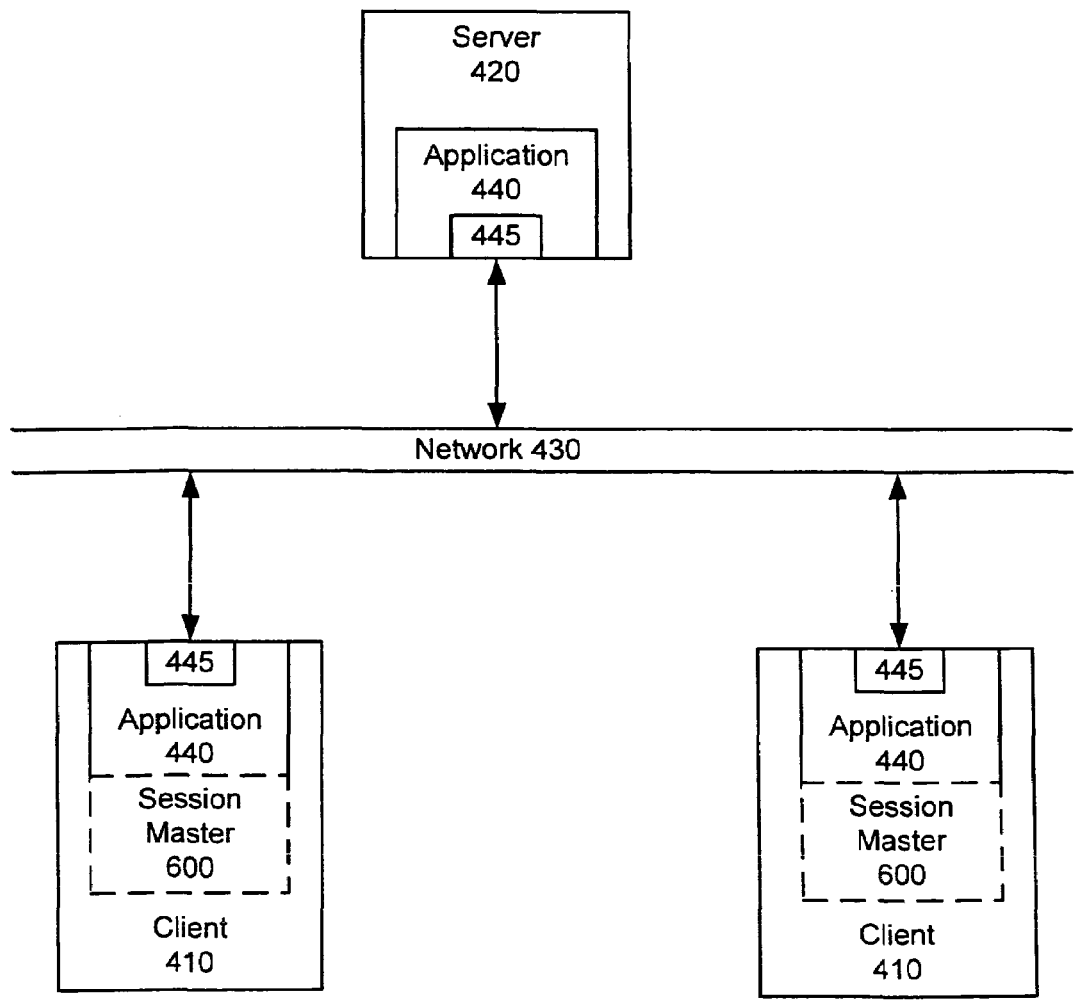
FIG. 7 is an illustration of a computer network system wherein the multi-user application is arranged in another type of communication configuration where multiple client computers are designated as session masters.

In another scheme, shown in FIG. 7, the application 440 has distributed ownership of the session master 600 among several computers. In the illustrated example, both of the client computers 410 share ownership of the session master 600. In such a case, both of the computers could perform the functions associated with the session master so that the network computers in FIG. 7 are in a peer-to-peer configuration. Thus, if one of the computers were to exit the online session, then the session itself would not terminate as a result of the session master computer's exit.

The session master can also operate in different modes as determined by the application 440. In a first mode, referred to as the dedicated mode, the application 440 fixedly assigns the ownership of the session master to a particular network computer. The application functionality associated with the session master is maintained by that computer and only that computer. Thus, if the computer that owned the dedicated session master were to malfunction or power down, then the tasks associated with the session master would not be performed. For example, if the session master were responsible for maintaining a certain aspect of an online gaming environment, then those aspects of the environment would terminate should the computer with dedicated ownership of the session master leave the online session.

In another mode, referred to as migrating mode, the ownership of the session master can migrate from one network computer to one or more other network computers participating in the online session. For example, the session master might be originally owned by the server computer 420 so that the online session of the application 440 is in a client-server configuration with respect to the responsibilities of the session master. This is shown in FIG. 6 where the session master 600 is shown as a solid-lined box attached to the server computer 420. Upon the occurrence of certain conditions, such as if the server computer 420 were to power down, then the application 440 could cause ownership of the session master 600 to migrate to another computer, such as one of the client computers. In this manner, for example, the session master 600 could be maintained in the classic client server communication configuration shown in FIG. 6 and then change to another configuration as circumstances warrant. For example, if the computer that owns the session master 600 were to quit the session, then ownership of the session master 600 could migrate to another computer or could be shared among plural computers.

Figure 8:
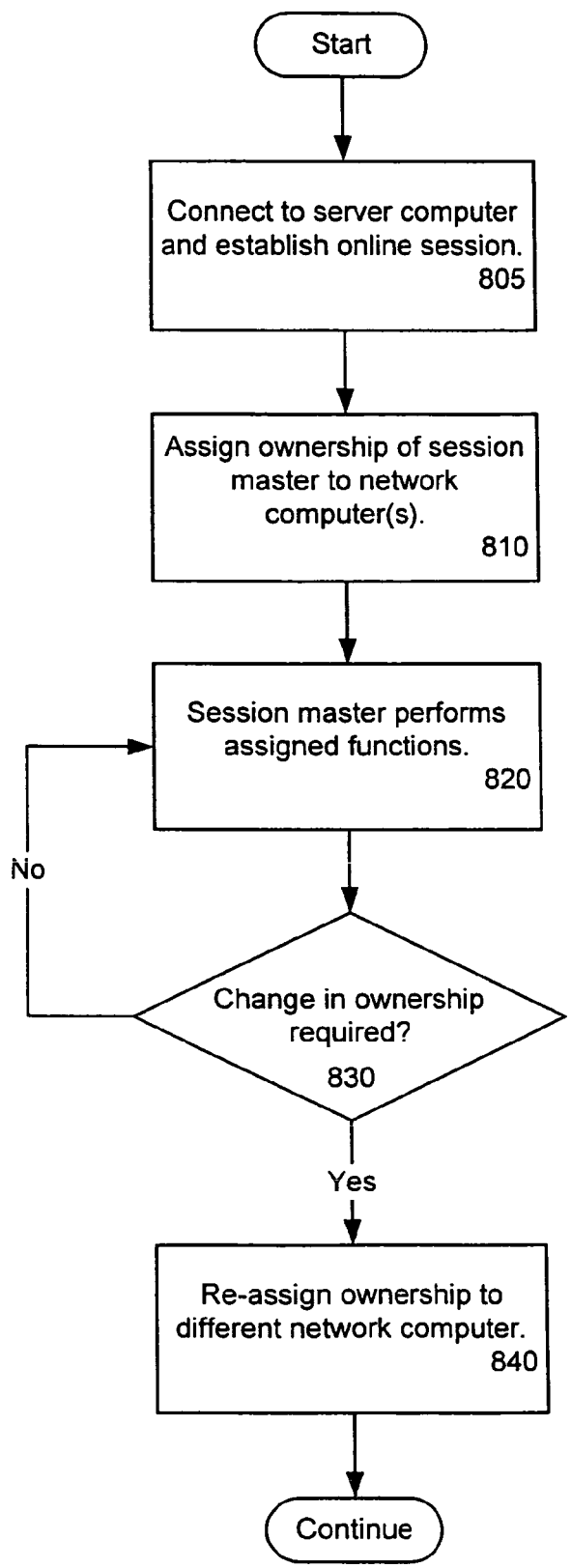
FIG. 8 is a flow diagram that illustrates the operations associated with the multi-user application re-assigning ownership of the session master.

The operations that occur in this process are represented by the flow diagram shown in FIG. 8. The process is described from the standpoint of a client computer 410 that is running an instance of the application 440. In the first operation, represented by the flow diagram box numbered 805, the computer 410 connects to the server computer 420 over a computer network. The computer 410 thereby establishes an online session of the application 440. This initiating computer is referred to as the host computer. Preferably, the application 440 of the host computer assigns itself with an index number for identification purposes. Another network computer that is also running the application 440 and that subsequently connects to the server computer 420 can join the online session of the application 440.

In the next operation, ownership of the session master is assigned to one or more network computers, as represented by the flow diagram box numbered 810. The host client computer 410 can designate itself as the session master, because it is the computer that established the online session. Alternately, the server computer 420 can be designated as the session master. The application itself will determine the manner in which session master functionality is assigned, and therefore a variety of session master assignment schemes can be implemented without departing from the teachings of the present invention. The server computer 420 and/or the client computer 410 keeps a record that identifies the computer or computers that are assigned the session master functions. When other network computers connect to the server computer 420 to join the online session, the session master computer notifies the other computers of the identity of the session master using the computer index number.

In the next operation, represented by the flow diagram box numbered 820, during the online session the session master computer performs the functions that are associated with the session master. The functions can include any of the responsibilities that are described above, including client arbitration, message filtering, and application-specific functions, such as maintaining the states of an online gaming environment.

The next operation is represented by the decision box numbered 830, where the application 440 determines whether the session manager ownership should change. In other words, the application 440 determines whether a migration in ownership of the session master should occur between the network computers participating in the session. The instance of the application 440 on the server computer 420 is preferably responsible for making the determination and then notifying the other network computers participating in the online session.

A change in ownership of the session master function could also occur where the computer that currently owns the session master has exited the online session, such as where the computer has shut down or malfunctioned. The determination that the session master has exited the online session can be based on whether any of the network computers have received communication messages from the session master computer. If no communication messages have been received within a predetermined amount of time, or if the session master does not respond to communication messages within a predetermined amount of time, then it is deemed that the session master computer has exited the online session. In such a case, the server computer 420 sends a notification to the computers participating in the online session. This situation results in a "Yes" outcome from the decision box 830.

From a "Yes" at the box 830, the system process then proceeds to the operation represented by the flow diagram box numbered 840, where the server computer 420, using its instance of the application 440, re-assigns ownership of the session master (and responsibility for the associated session master functions) to a different network computer. In this manner, ownership of the session master and its associated responsibilities will migrate to another network computer so that the online session continues, rather than terminating with the exiting of the prior session master computer. The application 440 on the server computer 420 can be configured to re-assign ownership in a wide variety of manners. For example, the application 440 can simply assign ownership of the session master to the next network computer in the computer index list. Alternately, the application can be configured so that a specific computer is assigned ownership of the session master according to a predetermined priority scheme.

With reference again to the decision box numbered 830, if a change in ownership is not required, then the result is a "no" outcome. In such a case, the network computer that currently owns the session master simply continues to perform its session master ownership functions pursuant to the operation represented by the flow diagram box 820. This processing continues until the online session terminates or until a change in ownership occurs.

As noted above, the communications configuration can be changed during the online session. Thus, a session can start out in a peer-to-peer communications configuration and can then change to a client-server configuration. The parameters for determining when each configuration is appropriate will depend on the resources needed and will be known to the developer of the application 440, but might involve, for example, the number of users in the online session, the requirements of the application, or the available bandwidth of a particular user.

Figure 12:
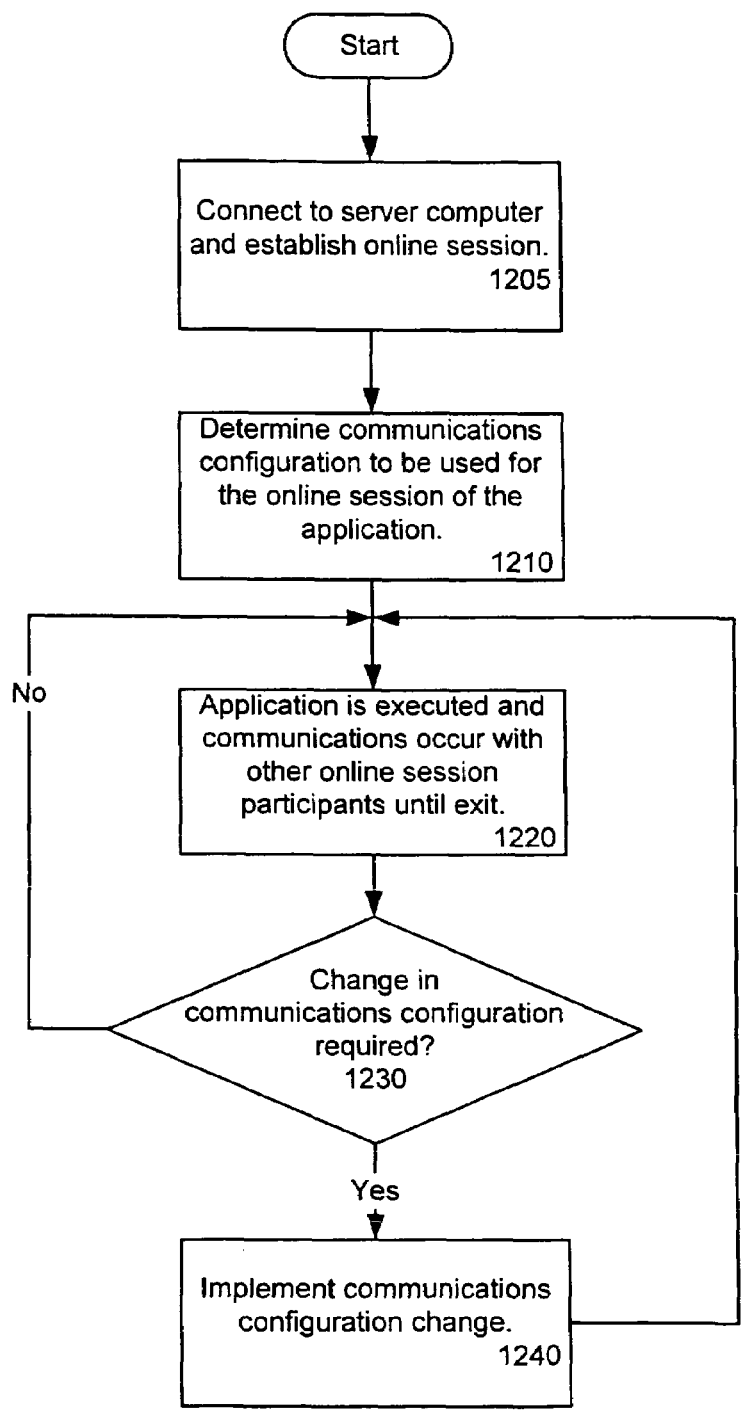
FIG. 12 is a flow diagram that illustrates the operation of the system to change the communications configuration of the application.

FIG. 12 illustrates the operation of the application to change the communications configuration. The operation is described from the standpoint of a client computer 410 that is running an instance of the application 440. In the first operation, represented by the flow diagram box numbered 1205, the computer 410 connects to the server computer 420 over a computer network. The computer 410 thereby establishes an online session of the application 440. This initiating computer is referred to as the host computer. As noted above, the application 440 of the host computer preferably assigns itself with an index number for identification purposes. Another network computer that is also running the application 440 and that subsequently connects to the server computer 420 can join the online session of the application 440 and will be assigned an index number by the host computer.

In the next operation, the communication configuration is determined, as represented by the flow diagram box numbered 1210. The determination is typically a function of the number of participants in the online session, but can also be determined by the application requirements for operation or by the communications bandwidth available to the application. The application then performs its operations until the user terminates the online session and ends the application. This continued operation is represented by the flow diagram box numbered 1220.

Checking for a change in communications configuration is represented by the decision box numbered 1230. This checking can be performed on a periodic basis, such as where the application checks for available bandwidth, or can be performed at the initiation of the online session, as desired. In addition, the checking can be initiated by a request or command received during the online session. The choice of which scheme to use and which decision parameters to apply will be made by the application developer.

If no change in communications configuration is needed, a "No" outcome at the decision box 1230, then operation of the application in the present communications configuration is continued, as indicated by the arrow back to box 1220. If a change in configuration is called for, a "Yes" outcome at the decision box 1230, then the change in communications configuration is implemented at box 1240 and then operation of the application is continued at 1220. This processing continues until the online session terminates or until the communication configuration is next checked and changed. The mechanism for changing the communication configuration will depend on the operating system employed by the network computer. Those skilled in the art will understand how to accomplish the change in communications configuration without further description.

The application 440 is preferably developed using a software development kit (SDK) that provides a library of object and communication message definitions that are used in the application 440. The software development kit includes an application interface through which applications are developed using the SDK and can be run on a network system, such as the network system 400. The application interface can reside in a central network server, such as the server 420, to which network computers that have the application 440 can log onto in order to operate an online session of the application. By using the object and message types provided by the SDK, the application 440 can be developed to include the features described above. The SDK preferably includes an object definition structure that provides a client-based definition of objects that are utilized by the application 440. The object definition includes a plurality of characteristics associated with each object and utilized by the application to effect interaction with clients over the computer network.

Figure 9:
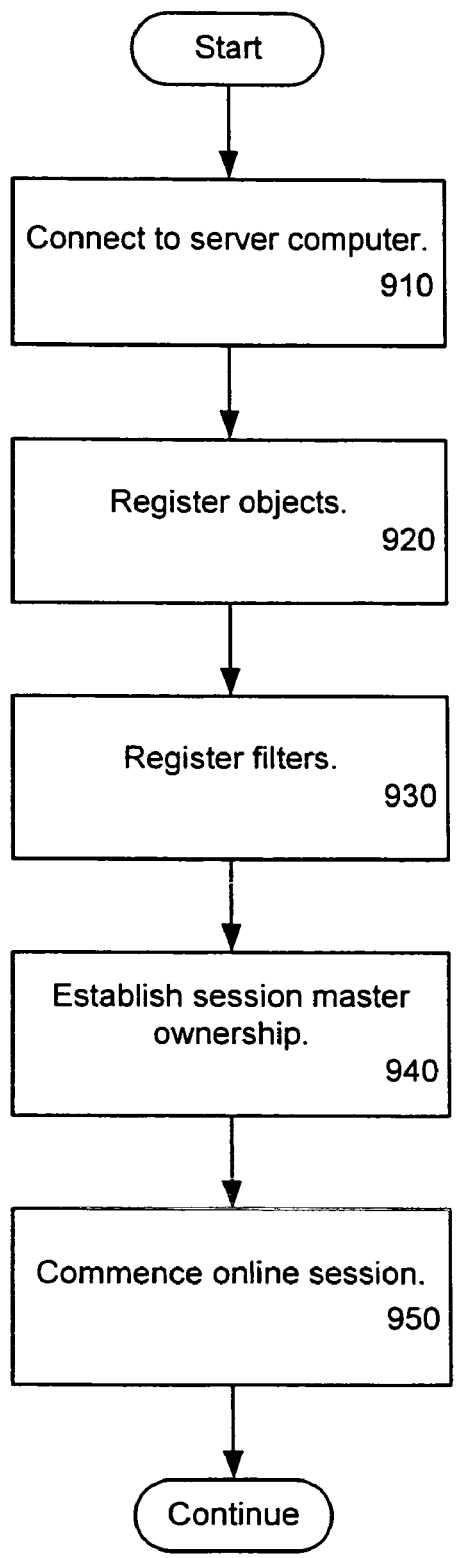
FIG. 9 is a flow diagram that illustrates the operating steps associated with the multi-user application establishing an online session.

Once the application 440 has been developed using the SDK, the application 440 can be loaded onto one or more network computers and an online session can be established according to the operations shown in FIG. 9. In the first operation, represented by the flow diagram box numbered 910, a network computer in which the application 440 is loaded connects to a network computer that includes in memory that application interface software. For example, one or more of the client computers 410, 412 of the network system 400 shown in FIG. 4 can have the application 440 loaded into their respective memory and the server computer 420 can include the application interface. In such a case, the client computers 410, 412 establish a communication connection with the server computer 420 over the network 430.

In the next operation, represented by the flow diagram box numbered 930, the application 440 registers objects according to the object definitions that are available in the library of the application interface. The application 440 also registers any message filters that will be utilized during the online session, as represented by the flow diagram box numbered 930.

In the next operation, represented by the flow diagram box numbered 940, the application 440 defines the session master and assigns ownership of the session master to one of the network computers. The ownership of the session master can be assigned to one computer or can be assigned to plural computers. The application 440 also specifies whether the ownership of the session master is dedicated to a particular computer or whether ownership can migrate to other computers in the manner that was described above with reference to FIG. 8.

During this operation, the application 440 assigns client indices to each of the network computers that will participate in the online session and also establishes the index table that was described above. The application 440 can be configured such that the first network computer to log onto the server computer will be the session master and also receive an index of one or zero. Subsequent network computers to log on will then receive the next consecutive available index. After the ownership of the session master or session masters has been established, the online session of the application 440 is commenced, as represented by the flow diagram box numbered 950.

Figure 10:
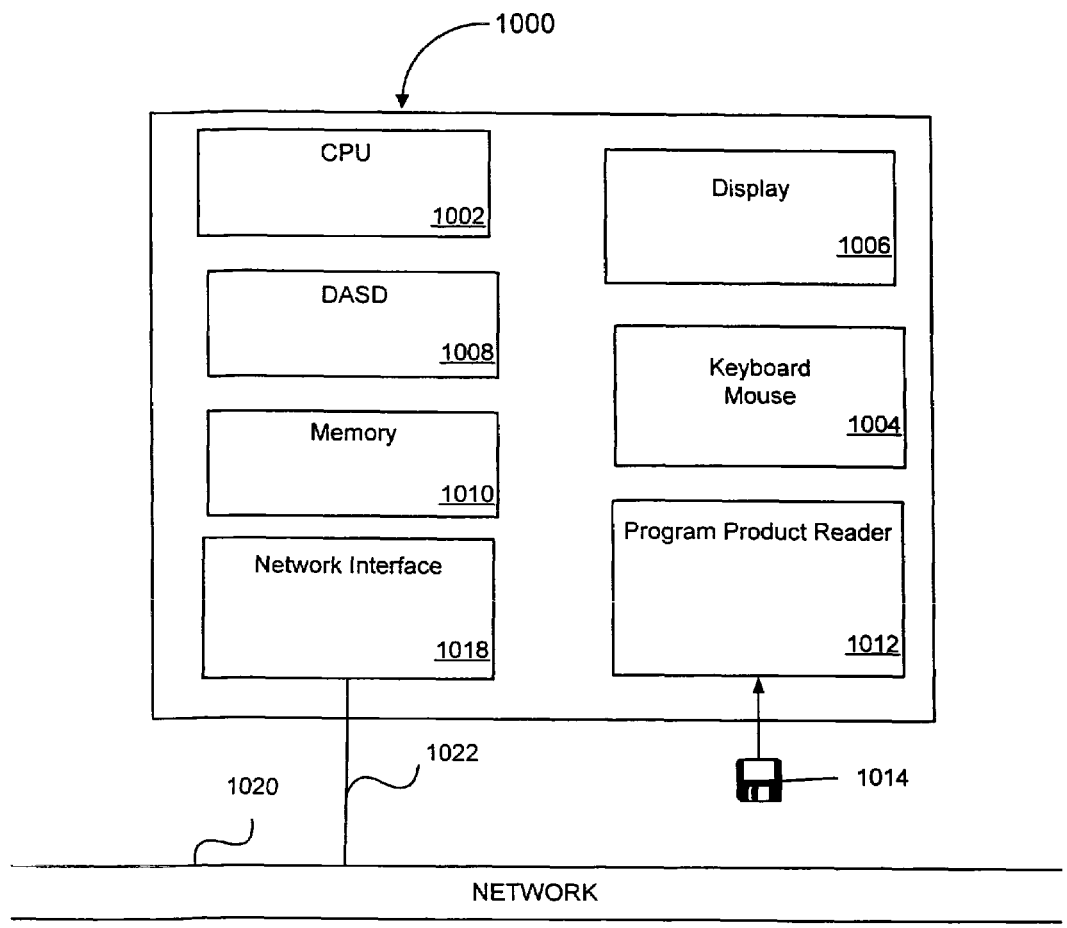
FIG. 10 is a block diagram of a computer in the network illustrated in FIG. 4, illustrating the hardware components.

As noted above, the network computers shown in the block diagram of FIG. 4 comprise nodes of a computer network system 400. FIG. 10 is a block diagram of a computer in the system 400 of FIG. 4, illustrating the hardware components included in one of the computers. Those skilled in the art will appreciate that the devices 410 and 420 can all have a similar computer construction, or can have alternative constructions consistent with the capabilities described herein.

FIG. 10 shows an exemplary computer 1000 such as might comprise any of the network computers. Each computer 1000 operates under control of a central processor unit (CPU) 1002, such as a "Pentium" microprocessor and associated integrated circuit chips, available from Intel Corporation of Santa Clara, Calif., USA. A computer user can input commands and data from a keyboard and computer mouse 1004, and can view inputs and computer output at a display 1006. The display is typically a video monitor or flat panel display. The computer 1000 also includes a direct access storage device (DASD) 1008, such as a hard disk drive. The memory 1010 typically comprises volatile semiconductor random access memory (RAM). Each computer preferably includes a program product reader 1012 that accepts a program product storage device 1014, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 1000 can communicate with the others over a computer network 1020 (such as the Internet or an intranet) through a network interface 1018 that enables communication over a connection 1022 between the network 1020 and the computer. The network interface 1018 typically comprises, for example, a Network Interface Card (NIC) or a modem that permits communications over a variety of networks.

The CPU 1002 operates under control of programming steps that are temporarily stored in the memory 1010 of the computer 1000. When the programming steps are executed, the computer performs its functions. Thus, the programming steps implement the functionality of the application 440. The programming steps can be received from the DASD 1008, through the program product storage device 1014, or through the network connection 1022. The program product storage drive 1012 can receive a program product 1014, read programming steps recorded thereon, and transfer the programming steps into the memory 1010 for execution by the CPU 1002. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 1010 over the network 1020. In the network method, the computer receives data including program steps into the memory 1010 through the network interface 1018 after network communication has been established over the network connection 1022 by well-known methods that will be understood by those skilled in the art without further explanation. The program steps are then executed by the CPU 1002 thereby comprising a computer process.

It should be understood that all of the network computers of the network system 400 illustrated in FIG. 4 can have a construction similar to that shown in FIG. 10, so that details described with respect to the FIG. 10 computer 1000 will be understood to apply to all computers of the system 400. It should be appreciated that any of the network computers can have an alternative construction, so long as the computer can communicate with the other computers illustrated in FIG. 4 and can support the functionality described herein.

Figure 11:
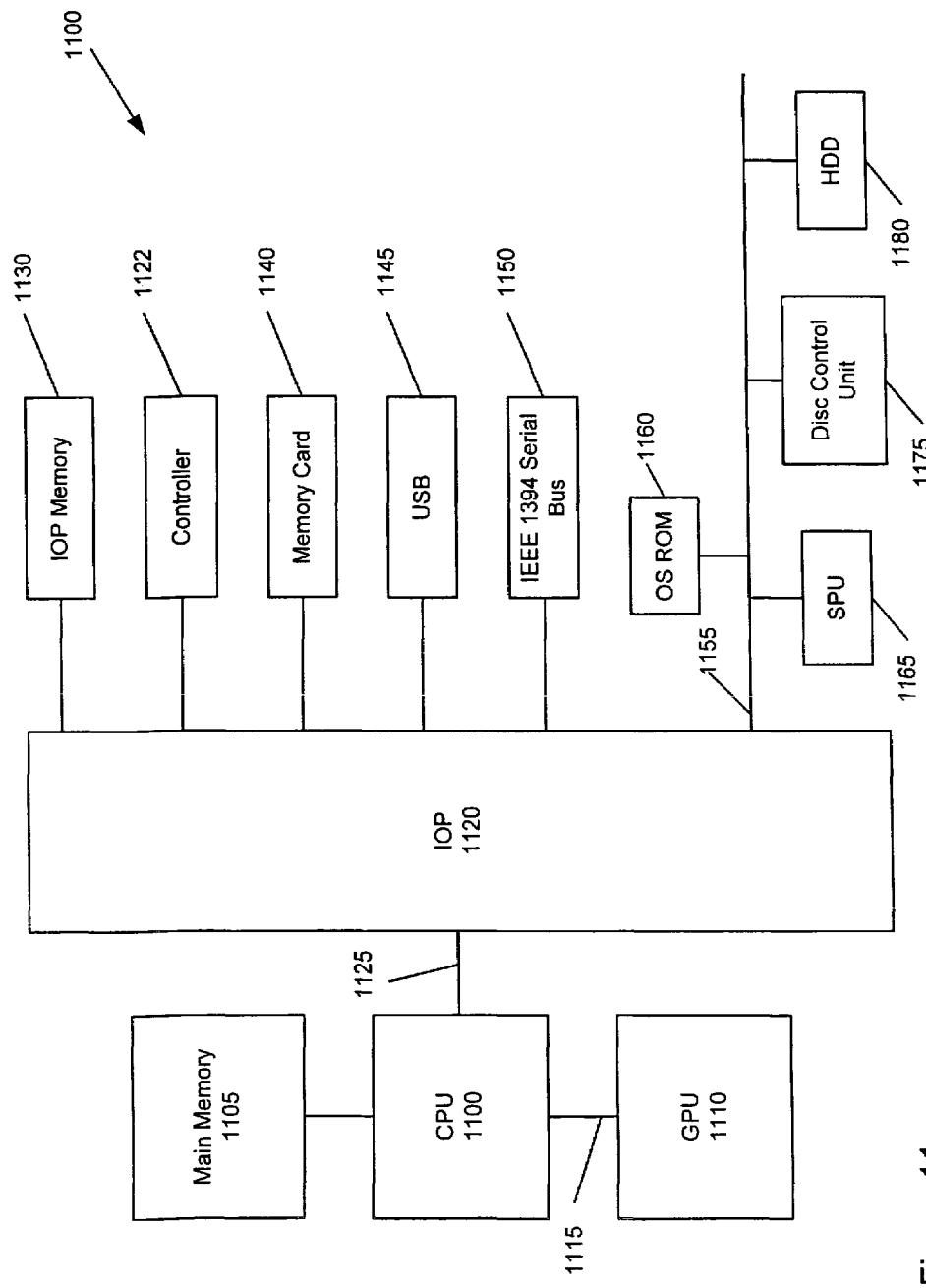
FIG. 11 is a block diagram of a computer entertainment system in the network illustrated in FIG. 4, illustrating the hardware components.

For example, with reference to FIG. 11, the client computers 420 can comprise a computer entertainment system, such as a video game system 1100. FIG. 11 is a block diagram of an exemplary hardware configuration of the video game system 1100.

The video game system 1100 includes a central processing unit (CPU) 1100 that is associated with a main memory 1105. The CPU 1100 operates under control of programming steps that are stored in the OS-ROM 1160 or transferred from a game program storage medium to the main memory 1105. The CPU 1100 is configured to process information and execute instructions in accordance with the programming steps.

The CPU 1100 is communicatively coupled to an input/output processor (IOP) 1120 via a dedicated bus 1125. The IOP 1120 couples the CPU 1100 to an OS ROM 1160 comprised of a non-volatile memory that stores program instructions, such as an operating system. The instructions are preferably transferred to the CPU via the IOP 1120 at start-up of the main unit 1100.

The CPU 1100 is communicatively coupled to a graphics processing unit (GPU) 1110 via a dedicated bus 1115. The GPU 1110 is a drawing processor that is configured to perform drawing processes and formulate images in accordance with instructions received from the CPU 1100. For example, the GPU 1110 can render a graphics image based on display lists that are generated by and received from the CPU 1100. The GPU can include a buffer for storing graphics data. The GPU 1110 outputs images to an audio-visual output device.

The IOP 1120 controls the exchange of data among the CPU 1100 and a plurality of peripheral components in accordance with instructions that are stored in an IOP memory 1130. The peripheral components can include one or more input controllers 1122, a memory card 1140, a USB 1145, and an IEEE 1394 serial bus 1150. Additionally, a bus 1155 is communicatively coupled to the IOP 1120. The bus 1155 is linked to several additional components, including the OS ROM 1160, a sound processor unit (SPU) 1165, an optical disc control unit 1175, and a hard disk drive (HDD) 1180.

The SPU 1165 is configured to generate sounds, such as music, sound effects, and voices, in accordance with commands received from the CPU 1100 and the IOP 1120. The SPU 1165 can include a sound buffer in which waveform data is stored. The SPU 1165 generates sound signals and transmits the signals to speakers.

The disc control unit 1175 is configured to control a program reader, which can comprise, for example, an optical disk drive that accepts removable storage media such as a magnetic floppy disk, an optical CD-ROM disc, a CD-R disc, a CD-RW disc, a DVD disk, or the like.

The memory card 1140 can comprise a storage medium to which the CPU 1100 can write and store data. Preferably, the memory card 1140 can be inserted and removed from the IOP 1120. A user can store or save data using the memory card 1140. In addition, the video game system 1100 is preferably provided with at least one hard disk drive (HDD) 1180 to which data can be written and stored.

A data I/O interface, such as an IEEE 1394 serial bus 1150 or a universal serial bus (USB) 1145 interface, is preferably communicatively coupled to the IOP 1120 in order to allow data to be transferred into and out of the video game system 1100, such as to the network 430 of FIG. 4.

Thus, a system and method has been described above for a dynamic configuration switching scheme for a multi-user network application. The scheme takes advantage of the fact that a peer-to-peer communications relationship among networked computers provides the advantages of faster communication when compared to client-server network communications, while recognizing that some applications, such as large scale game playing, in a peer-to-peer relationship requires a bandwidth that makes peer-to-peer impractical. For example, sports games with perhaps no more than three to six competitors per game might be suitable for peer-to-peer mode, but role playing games or action games that can involve hundreds of players are not suitable for peer-to-peer, and must run in a client-server mode. The configuration switching feature of the invention permits dynamically changing between a peer-to-peer architecture and a client-server architecture, while a user is logged on with an application server for an online session of the application.

For example, game players who are participating in a game can all communicate with a game server for game management, and will communicate with the other game players for sharing game data and player data. During game play, the players can switch between peer-to-peer communications and client-server communications for communicating information with the other game players. In this way, as described above, the game configuration can switch between an Integrated Server, where one of the game playing clients is performing a game server function, and peer-to-peer, where each one of the game players stores game state information and communicates with the other game players. The system also can switch between peer-to-peer, Integrated Server, and a game server configuration. This permits using the faster communications of peer-to-peer when the network bandwidth and game application are suitable, and using client-server when required by the network situation.

The present invention has been described above in terms of a presently preferred embodiment so that an understanding of the present invention can be conveyed. There are, however, many configurations for the system and application not specifically described herein but with which the present invention is applicable. The present invention should therefore not be seen as limited to the particular embodiment described herein, but rather, it should be understood that the present invention has wide applicability with respect to multi-user applications generally. All modifications, variations, or equivalent arrangements and implementations that are within the scope of the attached claims should therefore be considered within the scope of the invention.

I claim:

1. A method of dynamically configuring an online session of a multi-user application that operates on a computer network, comprising:

establishing communication connections between at least two computers on the computer network, each of which is executing the multi-user application, to thereby establish an online session of the multi-user application, wherein the multi-user application defines communication configuration types that are applied during the online session;

designating one of the computers as a session master computer that is responsible for managing functionality associated with the multi-user application;

detecting that the session master computer has exited the online session;

designating a second computer as the session master computer so that the second computer is responsible for managing the functionality associated with the multi-user application; and determining if a current communication configuration type should be changed on-the-fly based on a state of the established communication connections for the online session, as defined by the multi-user application for the online session after the designation of the second computer as the session master and wherein changing of the communication configuration type is to change the communication protocol by selecting a new port or network socket through which an instance of the application communicates over the network.

2. A method as define in claim 1, wherein the first computer and the second computer are initially arranged in a client-server communication configuration, and wherein the first computer is a server computer and the second computer is a client computer relative to the first computer.

3. A method as define in claim 1, wherein the application also designates a third computer as a session master computer that shares responsibility for managing the functionality associated with the multi-user application with the second computer so that the second and third computers are in a peer-to-peer communication configuration.

4. A system that dynamically configures an online session of a multi-user application, the system comprising one or more processors that execute program instructions and receive a data set, wherein the program instructions cause the system to perform operations including:

establishing communication connections between at least two computers on the computer network, each of which is executing the multi-user application, to thereby establish an online session of the multi-user application, wherein the multi-user application defines communication configuration types that are applied during the online session;

designating one of the computers as a session master computer that is responsible for managing functionality associated with the multi-user application;

detecting that the session master computer has exited the online session;

designating a second computer as the session master computer so that the second computer is responsible for managing the functionality associated with the multi-user application; and determining if a current communication configuration type should be changed on-the-fly based on a state of the established communication connections for the online session, as defined by the multi-user application for the online session after the designation of the second computer as the session master and wherein changing of the communication configuration type is to change the communication protocol by selecting a new port or network socket through which an instance of the application communicates over the network.

5. A program product for use in a computer system that executes program steps recorded in a computer-readable media to perform a method of dynamically configuring an online session of a multi-user application, the program product, wherein the program steps comprise:

establishing communication connections between at least two computers on the computer network, each of which is executing the multi-user application, to thereby establish an online session of the multi-user application, wherein the multi-user application defines communication configuration types that are applied during the online session;

designating one of the computers as a session master computer that is responsible for managing functionality associated with the multi-user application;

detecting that the session master computer has exited the online session;

designating a second computer as the session master computer so that the second computer is responsible for managing the functionality associated with the multi-user application; and determining if a current communication configuration type should be changed on-the-fly based on a state of the established communication connections for the online session, as defined by the multi-user application for the online session after the designation of the second computer as the session master and wherein changing of the communication configuration type is to change the communication protocol by selecting a new port or network socket through which an instance of the application communicates over the network.

* * * * *